United States Patent [19]

Willetts

[11] 4,132,433
[45] Jan. 2, 1979

[54] MULTIPLE AXLE SUSPENSION SYSTEM

[76] Inventor: Elwood H. Willetts, 102 S. Penataquit Ave., Bay Shore, N.Y. 11706

[21] Appl. No.: 807,002

[22] Filed: Jun. 16, 1977

Related U.S. Application Data

[63] Continuation-in-part of Ser. No. 706,730, Jul. 19, 1976.

[51] Int. Cl.$^2$ .............................................. B60G 11/20
[52] U.S. Cl. .................................. 280/712; 280/716; 267/35
[58] Field of Search ............... 280/713, 716, 681, 712, 280/711; 267/15, 21, 35

[56] References Cited

U.S. PATENT DOCUMENTS

| 3,653,683 | 4/1972 | Hendrickson | 280/713 |
| 3,761,109 | 9/1973 | Campbell | 280/716 |

Primary Examiner—Philip Goodman
Attorney, Agent, or Firm—Paul J. Sutton

[57] ABSTRACT

The present invention discloses a multiple axle articulated suspension structure and system for vehicles wherein road and tire excitations of each axle are isolated from their opposing axle, as well as from the sprung mass. This is accomplished via deflections of pressure-resistant spring means and load-equalizing supports. In preferred embodiments of this invention, both trailer and track versions of my novel vehicle suspension system are disclosed as having separately trunnioned rocker beam assemblies supported by cross axles, and wherein air and elastomeric spring means are combined in a number of combinations thereof. Air, elastomeric and hydraulic spring arrangements are contemplated, where the air spring is supplied with air at varying pressures which are a function of the load on the suspension, and wherein a height gauge located between the axle and the frame controls this pressure. An elastomer serves both to partially dampen the air spring, as well as to provide load deflection resistance to an undersized air spring. Other embodiments are disclosed.

This invention relates generally to suspension structures for use with multiple axle vehicles, and more specifically this invention relates to a composite, elastomerically damped suspension structure for tandem axles, which exhibits a progressively increasing spring rate under and when subjected to increasing loads.

5 Claims, 3 Drawing Figures

MULTIPLE AXLE SUSPENSION SYSTEM

This is a continuation-in-part patent application of my pending application Ser. No. 706,730 filed July 19, 1976 and entitled TANDEM AXLE VEHICLE SUSPENSION SYSTEM.

The subject matter of my U.S. Pat. No. 3,856,325, granted on Dec. 24, 1974, is incorporated by reference within this specification. In addition, my U.S. Pat. No. 3,572,745 granted on Mar. 30, 1971 is to be incorporated by reference within this application, the latter being a continuation-in-part of application Ser. No. 721,558, filed Apr. 1, 1968, now abandoned, and application Ser. No. 649,502 filed June 28, 1967, now abandoned.

This specification will be divided into two parts; the first (pp. 1–28) dealing with the subject matter of my application Ser. No. 706,730 entitled TANDEM AXLE VEHICLE SUSPENSION SYSTEM which will issue into U.S. Pat. No. 4,030,738 on June 21, 1977; the second comprising improvements which are thereafter set forth in detail.

A suspension system contemplated by one embodiment of thsi invention includes a vehicle frame which is supported by a bracket depending downwardly from the frame. The bracket is supported by a pair of rocker beams having horizontal and vertical components. The horizontal components of the rocker beam are supported by a pair of laterally extending vehicle axles by any suitable means.

In the present invention, an air spring is employed to which air is supplied at varying pressures depending upon the load on the suspension. A relatively simple height gauge located between the axle and frame senses and controls the pressure. An elastomer both provides load deflection resistance to an undersized air spring and dampens the air spring. A hydraulic system may also be used to dampen the air spring.

The present invention that will be described within this specification and accompanying drawings applies particularly to a suspension system for a short wheel base bogie of a truck-tractor, rather than the so-called wide spreads or extended wheel bases or special length trucks. As now used, air suspensions on conventional truck-tractors comprise a short beam hinged below the vehicle frame and supported by a cross axle, with an air spring disposed outwardly of the axle between the top of the beam and the underside of the frame. The support beam simply does not afford sufficient transverse verticle freedom to the axle, as is obtained with other suspensions, nor is there proper load equalization between the axles.

Air springs have not been used on truck-tractors having separately trunnioned and oppositely disposed rocker beams restrained against load deflection by a compressive spring means disposed between the vertically extending components of the rocker beams. This has been due to the fact that designers have not found adequate space for the air spring system. Furthermore, the interconnecting prop shaft of a tractor extends longitudinally within the frame, which precludes the arrangement taught by U.S. Pat. No. 3,003,781 for trailers, granted to Black.

With the loaded height of a frame restricted to 38 inches, in order to enable fifth wheel engagement with the trailer, this space in a 50 inch wheel base bogie, with sufficient articulation clearance at the tires, enables but a 9-inch diameter air spring with a 3600 pound capacity. In order to clear the fifth wheel, the 9-inch air spring may be disposed or located approximately 20.5 inches over the trunnion assembly which, in turn, is 21 inches from the axle. In such an arrangement, the air spring will supply but 49 percent of the 7200 pound unsprung wheel load.

According to one aspect of the present invention, a novel arrangement of a spring means over and between the tires of adjacent axles will provide deflection reaction on both axles, while enabling the isolation of excitations of each axle from the sprung mass and from the opposing axle, thus preventing resonance and resultant wheel hop.

A comparison of some 37 tractor suspensions shows that the average price and weight of 25 leaf-type spring suspensions is approximately $554 and 1,018 lbs. The price and weight for 12 air spring suspensions averages $513 more and 88 lbs. more than for a leaf spring suspension. Yet, air suspensions that are currently in use simply lack equalization of load between the axles and further lack equalization of the load between opposite ends of an axle until the increased load torsionally deflects the support beam, or a track baris installed transversely for each axle.

The present invention overcomes disadvantages and drawbacks of prior art attempts to solve the aforesaid problems by providing a basic suspension system or structure to which a number of different spring means may be applied.

A spring means arrangement includes an elastomer-supported air spring arrangement wherein the air spring and the elastomer are disposed in parallel with respect to one another and wherein both the air spring and the elastomer are reactive on both axles. This embodiment of the invention is most beneficial where restricted control of frame deflection is required throughout the load range of the suspension. The parallel arrangement of the air spring and elastomer affords the required spring force within the space limitations available in a short wheel base suspension. In this arrangement, the hysteresis of the elastomer serves to dampen the fluctuations or excitations induced within the elastomer. The air spring affords control of the frame height through air pressure which is varied, depending upon the load on the suspension. A gauge located between the axle and frame controls air pressure to the air spring. Fluctuations of the air spring are damped hydraulically, either in series or parallel with the elastomer.

Another arrangement includes an elastomer in series with an air spring which is remotely disposed within the suspension structure, and which is hydraulically interconnected with the elastomer so that the elastomer dampens the excitations of the axles on the hydraulic system to prevent what is commonly referred to as the "water hammer" effect. The restrictions of the hydraulic system dampen the fluctuations in the air spring, which affords relative frame height control.

Still another embodiment of my invention is useful where both frame deflection control and the ultimate in critical damping is required. In this case, the combination of an air spring disposed in parallel relationship with respect to a first elastomer between the rockers and a first hydraulic cylinder is utilized in cooperation with a remotely disposed second hydraulic cylinder which is supported by a second elastomer adjacent to and in series with this second hydraulic cylinder. Thus, the first and second elastomers function in series relationship, while the first and second hydraulic cylinders are interconnected by a hydraulic line. The elastomers serve to cushion the impacts on the momentarily inert hydraulic mass which, in turn, then moves in a predetermined velocity to dampen the movement of the rockers, while the total deflection of the rockers equals the sum of the deflections of the elastomer and hydraulic strokes.

The advantages of this suspension structure, which are common to all of different spring means arrangements just described, enable an economy of both cost and weight. In addition, the spring forces are on each transverse side of the suspension structure and are reactive on both axles, thus requiring but two, instead of four, air springs. Four air springs are commonly employed with conventional suspension structures known to the prior art.

It is an object of the present invention to provide a suspension system of the novel type just described above.

Another object of the present invention is to provide a suspension system wherein the deflection restraint of a partial capacity air spring is supplemented with either a partial capacity elastomer, or another air spring, or a compressive steel spring, arranged in parallel and reactive on both axles.

Another object of the present invention is to provide a suspension system wherein an air spring is disposed remotely within the suspension structure, transversely of the vehicle length and between the axles, but which yet functions in a series with an elastomer compressively restrained between the opposing faces of rocker beams. This feature of the present invention contemplates the hydraulic interconnection of the elastomeric and air-type springs whereby the elastomer dampens the excitations of the axles on said hydraulics, while the same hydraulics are restrained to dampen the pulsations of the air spring within the same suspension system. This enables the structure to better withstand the impacts on the tractor fifth wheel from a high-frequency trailer suspension.

Still another object of the present invention is to provide one or more rolling-sleeve cylinder air spring arrangements to the rolling-sleeve type of hydraulic cylinder, whereby the axial alignment of both of the rolling sleeve-type cylinders is preserved throughout their operational stroke or travel.

A still further object is to provide a suspension structure employing a multiple of spring means wherein vertical freedom at opposite ends of each axle is realized throughout the load range, as with all leafspring suspensions known to the art.

Yet another object of this invention is to provide reactive spring means which serves to isolate the sprung mass from the excitations of each axle, as well as from the opposing axle.

Still a further object is to provide a multiple spring arrangement wherein axial alignment of the spring elements is preserved, while reducing the cost, weight and complexity of the tandem axle vehicle suspension while all the time improving the performance characteristics of the suspension system over what is commonly realized in presently known air suspensions.

The invention will be more clearly understood from the following description of specific embodiments of the invention, together with the accompanying drawings, wherein similar reference characters denote similar elements throughout the several views, and in which.

Before referring in detail to the various drawings listed above, it will be worthwhile here to once again characterize one aspect of my invention by referring to a system provided by me wherein a basic suspension structure is provided to which any combination of four or more different types of spring means may be applied. More specifically, a self-dampening elastomer may be provided in combination with other types of spring means, wherein the spring rate is controlled by varying air pressure, thereby enabling a relatively soft ride at empty load conditions and a higher spring rate resistant to transverse roll of relatively highly-centered or located loads.

A second type of spring combination includes an elastomer-supported air spring arrangement, in parallel configuration and reactive on both axles of the suspension structure, with the hysteresis characteristics of the elastomer further serving to dampen the fluctuations of the air spring, which affords relative frame height control.

A third arrangement is also provided by the present invention, wherein an elastomer is arranged in series with an air spring disposed remotely within the suspension structure, and hydraulically interconnected with the elastomer, so that the elastomer dampens the excitations of the axles, which may be induced by road conditions, on the hydraulic system, to prevent what is commonly referred to as "water hammer" effect. Furthermore, restrictions in the hydraulic system dampen fluctuations in the air spring.

A fourth arrangement is further provided, wherein the combination of an air spring in parallel with a first elastomer between the rockers and a first hydraulic cylinder adjacent to and in series with the first elastomer, and a remotely disposed second hydraulic cylinder supported by a second elastomer adjacent to and in series with the second cylinder. In this arrangement the first and second elastomers function in series, with the first and second hydraulic cylinders interconnected by a hydraulic line, or the like.

The advantages of this suspension structure system, wherein different spring means may be applied, include an economy of both cost and weight. These benefits are realized by any and all four of the above-referenced spring means combinations. In addition, the spring force on each transverse side of the suspension structure is reactive on both axles, thus enabling the use of but two (rather than four) air springs. Conventional designs require four air springs which add to the weight and cost. Additional benefits reside in the resilient equalization of load between opposing axles.

Figure 1:
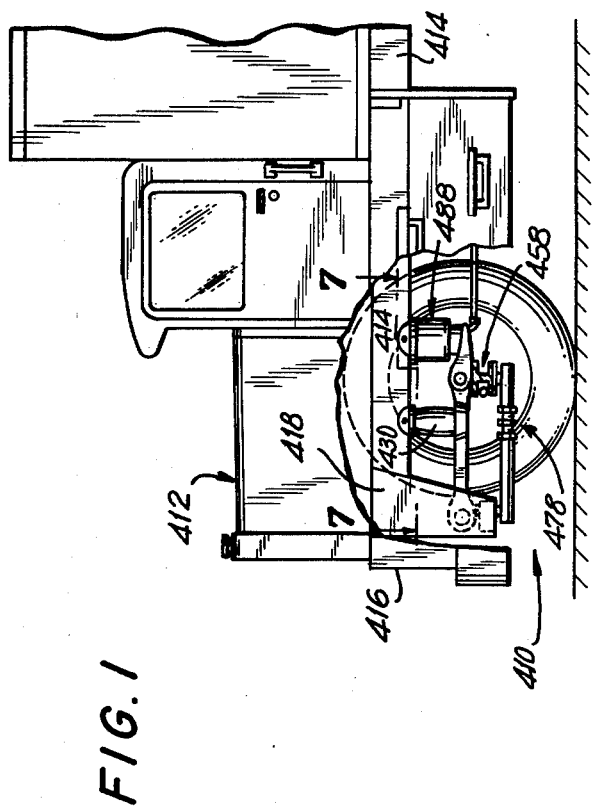
FIG. 1 is an elevational view of a truck which is equipped with independent front and rear axle suspension structures, the frong axle structure being accoring to my invention.
Figure 2:
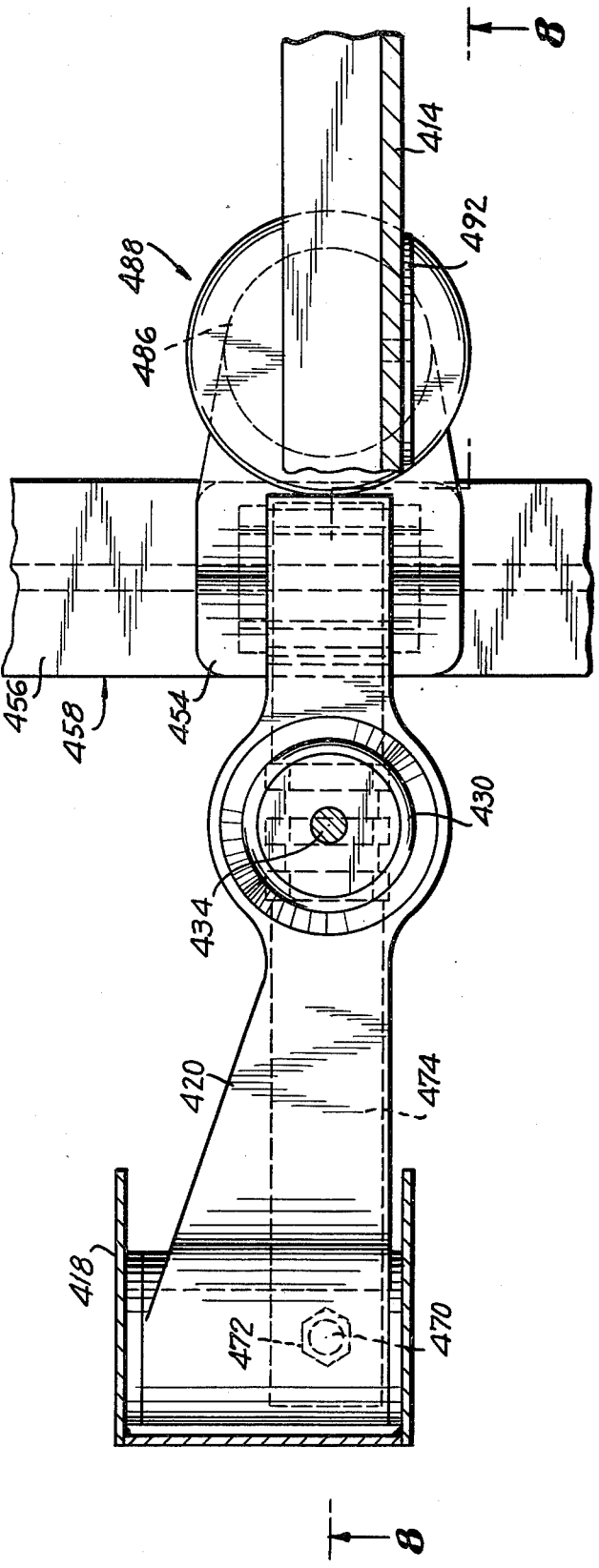
FIG. 2 is a plan view taken along line 7 — 7 of FIG. 6.
Figure 3:
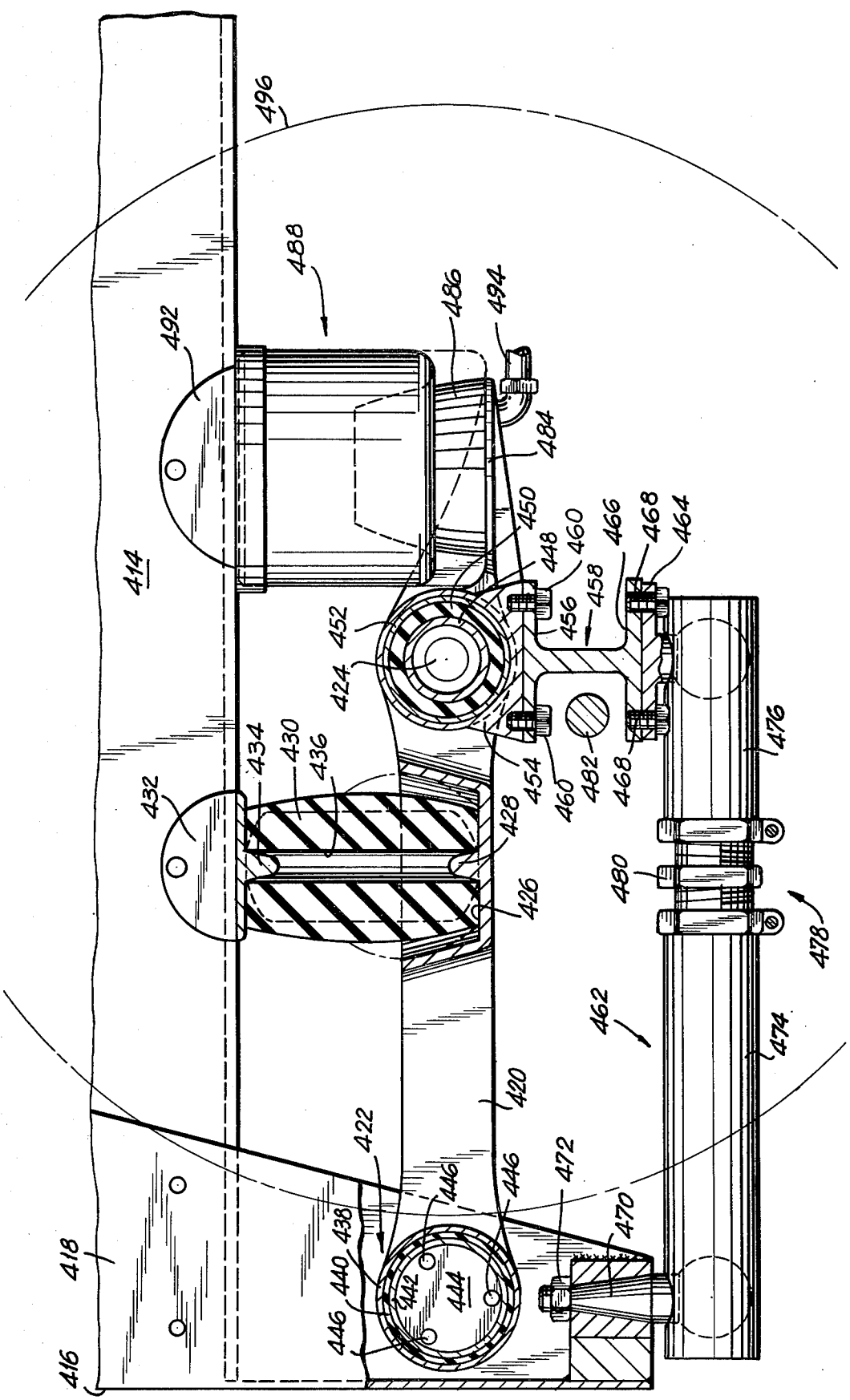
FIG. 3 is a fragmentary sectional elevational view taken along line 8 — 8 of FIG. 7.

I wish now to specifically address myself to FIGS. 1-3 of the drawings, wherein improved and preferred embodiments of my invention are illustrated. In FIG. 1, a suspension system 410 is illustrated as comprising a front steering axle suspension system operatively located within a truck 412. Vehicle or truck frame 414 is shown in both of FIGS. 1 and 3 extending above the suspension system 410 in a longitudinal direction with respect to the longitudinal axis of truck 412. Frame 414 terminates at its forwardmost end 416 at a depending over-end bracket 418 which, in turn, extends downwardly from frame 414.

As best seen in FIG. 3, a longitudinally-extending beam member 420 extends between a bearing assembly 422 at its forwardmost end, and front steering axle 424 at a midpoint near its rearwardmost end. Substantially concave surfaces 426 surrounding an upwardly extending pilot member 428 comprise an integral part of beam member 420.

Surfaces 426 basically provide an elastomeric springseat for an elastomeric member 430 which extends upwardly from this springseat to and into engagement with an upper springseat bracket 432 which, in turn, is formed with a downwardly extending pilot member 434. Bracket 432 may be secured to frame 414 by any suitable conventional fastening means such as by bolting, riveting or welding. Pilots 428 and 434 extend within a central opening 436 within elastomeric member 430, thereby captively engaging the elastomer and preventing its disengagement from the upper and lower spring seats. In FIG. 8, elastomer 430 is shown in its compressed and stressed condition, whereas its normal substantially straight configuration is shown in phantom outline within the full line illustration. Additional phantom lines outside the full-line representation of elastomer 430 depict a state of higher compression, perhaps its limit within predetermined design parameters.

Referring to the forwardmost end of beam member 420, it can be seen in FIG. 1 that beam 420 terminates at and is trunnioned at its forward end through an outer collar or sleeve 438 of bearing assembly 422. A substantially low-friction elastomeric liner 440 is coaxially disposed within outer sleeve 438 and encircles an inner sleeve 442 which, itself, has both of its ends closed by plug members 444 welded thereto. Plug members 444 are each formed with tapped holes to accept threaded bolts or fasteners 446 which secure same to depending bracket 418. Liner 440 may be a bonded elastomer stressed in torsional shear interconnecting 438 and 442, thus providing load deflection resistance as is otherwise provided by elastomer 430.

Steering axle spindle 424 lies within an inner sleeve hinge 448 which, in turn, lies within an encircling low friction elastomeric liner 450 which, in turn, is situated within an encircling outer sleeve 452 to which beam 420 is either affixed or formed integrally therewith. In a preferred embodiment of this invention, outer sleeve 452 is held within a bracket 454 which, in turn, is physically connected to the top flange 456 of I-beam 458 by means of bolts 460.

A torque rod assembly 462 interconnects I-beam 458 with bracket 418 by means of a flanged bracket 464 which is bolted to the lower flange 466 of I-beam 458 by means of bolts 468. Flanged bracket 464 terminates at its lowermost end in a ball end, as does a ball end member 470, which interconnects the opposite end of torque rod assembly 462 to the bottommost portion of deepending bracket 418, via nut 472.

Torque rod assembly 462 is made up of two longitudinal portions 474 and 476 which are interconnected by a turnbuckletype of adjustment assembly 478 including a hexagonal ringnut 480, which will cause rod portions 474 and 476 to move toward or away from one another, as desired. It is to be noted that for the convenience of the reader, torque rod assembly 462 is shown in greater scale than the other portions of this vehicle suspension system. A steering tie rod 482 is shown adjacent the web of I-beam 458, and extends transversely with respect to the longitudinal axis of the vehicle.

Rearward of steering axle spindle 424 is an outwardly extending shelf 484 which, in a preferred embodiment of this invention, comprises an extension of beam 420. Shelf 484 supports the inner member 486 of a rolling-sleeve air spring assembly 488, the outer and upper member 490 of airspring assembly 488 engaging an upper seating bracket 492 which, in turn, is secured to frame 414 in much the same manner as previously described for bracket 432. An air conduit 494 is fragmentarily shown in FIG. 8 in an effort to depict an interconnection between air spring assembly 488 and a reservoir of air or an air tank remotely disposed. It should also be noted that a tire 496 is shown in phantom outline within FIG. 3 so as to orient the reader with respect to the components already discussed.

In operation, the embodiment of my invention shown in FIGS. 1, 2 and 3 represents a single axle suspension system which includes a plurality of spring means (multiple spring means). An elastomer stressed in torsional sheer comprises the rocker beam trunnion, and exists in combination with an air spring assembly 488, combined with an elastomer 430 compressively resistant to deflection and operationally providing a progressively increasing spring rate to offset the reaction normally experienced on the tractor fifth wheel, of which this front axle is a supporting member. The reaction referred to comes about from a relatively highly-centered trailer load, which presents problems at times of an emergency brake stop.

Each of the spring means shown in FIG. 3 shares the total resistance to load deflection of the spring system, with the air spring affording a controlled frame height throughout the load range of the spring system. In addition, an important feature of this invention resides in the providing of a relatively low frequency ride at empty load conditions. The compressive resistant elastomer 430, with its high hysteresis, dampens the excitations normally produced within the air spring. The progressively increasing spring rate just referred to further provides an essential aid to air spring resistance to the added static forces which result from directional changes of travel, especially critical with highly-centered loads. The reader is referred to my U.S. Patent No. 3,985,819 granted July 22, 1975 for an illustration of another form of single axle suspension system.

The present invention has been described in sufficient detail to enable one of ordinary skill in the art to make and use same. Obviously, modifications and alterations of the aforedescribed preferred embodiments of my invention will occur to others upon a reading and understanding of the specification and drawings, and it is my intention to include all such modifications and alterations as part of my invention, insofar as they come within the proper scope and spirit of the invention as defined by the appended claims.

What is claimed is:

1. A vehicle axle suspension system operatively providing a progressively increasing spring rate, comprising, in combination: a vehicle frame structure, a support bracket depending from and secured to said vehicle frame structure, a support trunnion assembly secured to said support bracket, a load-bearing vehicle axle disposed below said frame structure, a suspension beam member cooperatively interconnecting said trunnion assembly and said vehicle axle at first and second points thereof, respectively, said suspension beam member extending rearwardly beyond said second point to a portion thereof comprising a lower air spring seat, a cooperating upper air spring seat secured to said vehicle frame, a lower spring seat integral with and disposed upon said beam member intermediate said trunnion assembly and said vehicle axle, a cooperating upper spring seat secured to and supporting said vehicle frame, a compressively resilient load-deflectible spring member disposed in contact with and interconnecting said lower and said cooperating upper spring seats, said spring member being operatively compressed between said spring seats under load, said vehicle axle being disposed vertically between said second end portion and a torque rod hingedly interconnected to both said support bracket and said vehicle axle, and an air spring assembly disposed in contact with and interconnecting lower and cooperating upper air spring seats, said air spring assembly being operatively compressed between said air spring seats under load.

2. A vehicle axle suspension system according to claim 1, wherein said spring member comprises a substantially cylindrical elastomer.

3. A vehicle suspension system according to claim 1, wherein said torque rod is adapted to preserve the vertical alignment of said vehicle axle during operational deflection of said vehicle axle suspension system, said torque rod being disposed vertically below said vehicle axle and hinge centers of said suspension beam member during operation thereof.

4. A vehicle axle suspension system according to claim 1, wherein said trunnion assembly includes a low friction liner disposed between inner and outer sleeve members.

5. A vehicle axle suspension system according to claim 1, wherein said lower spring seat is disposed nearer said vehicle axle than said trunnion assembly.

* * * * *